E. ARMSTRONG.
FILE, RASP, OR SIMILAR TOOL.
APPLICATION FILED JAN. 22, 1910.

995,761.

Patented June 20, 1911.

2 SHEETS—SHEET 1.

Witnesses:

Inventor:
Ernest Armstrong
by Henry L. Williams
Atty.

E. ARMSTRONG.
FILE, RASP, OR SIMILAR TOOL.
APPLICATION FILED JAN. 22, 1910.

995,761.

Patented June 20, 1911.

2 SHEETS—SHEET 2.

Witnesses:

Inventor:
Ernest Armstrong
by Henry D. Williams
Atty.

UNITED STATES PATENT OFFICE.

ERNEST ARMSTRONG, OF ENFIELD, ENGLAND.

FILE, RASP, OR SIMILAR TOOL.

995,761.　　　　　Specification of Letters Patent.　Patented June 20, 1911.

Application filed January 22, 1910. Serial No. 539,512.

*To all whom it may concern:*

Be it known that I, ERNEST ARMSTRONG, a subject of the King of England, residing at Enfield, in Middlesex, England, have invented certain new and useful Improvements in Files, Rasps, or Similar Tools, of which the following is a specification.

This invention relates to files, rasps or similar tools and has for its object to provide a tool of this kind of higher efficiency than those hitherto constructed.

According to this invention, a file, rasp or similar tool has continuous or interrupted teeth approximately V-shape with blunt rounded parts joining the sides of the V. They are preferably curved throughout and the curve which most completely accomplishes the object of my invention is the hyperbola, although parabolas and ellipses or other curves approximating thereto may be employed.

In the accompanying drawings various constructions of files according to this invention are illustrated, each of the figures showing a plan view of the file.

Like letters indicate like parts throughout the drawings.

Figure 1:
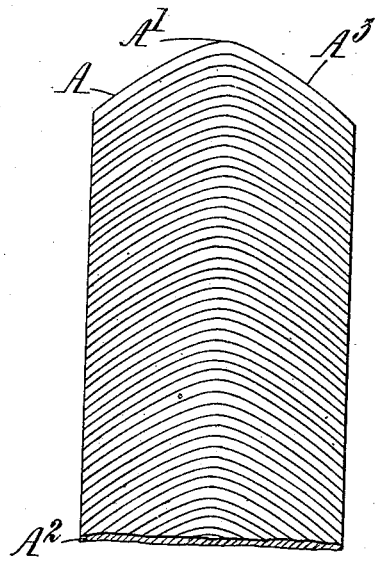

Referring to Figure 1, the teeth lie on portions of hyperbolic curves A. these curves being symmetrical with respect to the center line $A^1 A^2$ of the file and the end $A^3$ being the front or tip of the file.

Figure 2:
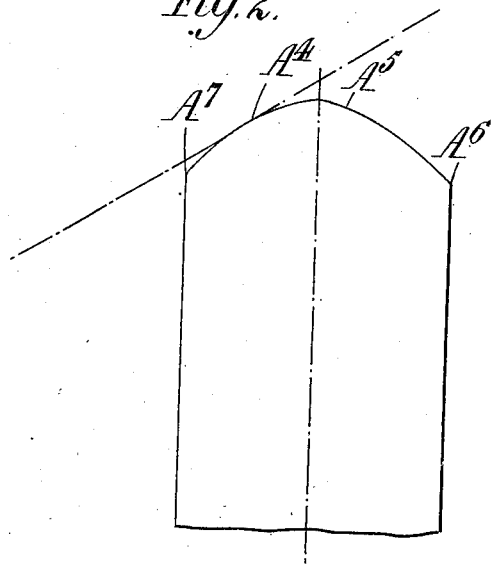

Fig. 2 illustrates an actual curve to which the teeth conform. The part $A^4 A^5$ does not act efficiently owing to the inclination being so great with respect to the axis of the file, but is of narrow width, and by reason of its curvature cuts smoothly and without scoring. The portions $A^5 A^6$ and $A^4 A^7$ are inclined so as to act very efficiently, and tangents to these portions change slowly from an angle of about 60° at the parts nearest the axis of the file, to an angle of about 45° at the parts farthest from the axis of the file.

Figure 3:
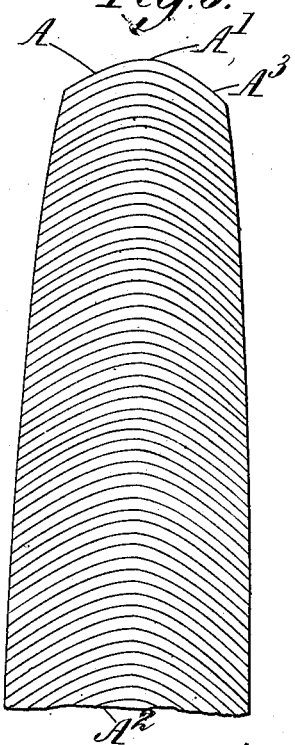

Fig. 3 illustrates a file having teeth lying on curves of the same shape as shown in Fig. 2, but having a tapered end.

Figure 4:
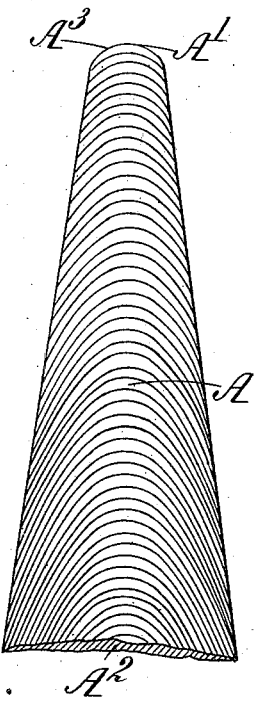

In Fig. 4 a half round tapered file is shown in which the teeth lie on hyperbolic curves. It will be noted that even where the file is tapered as in this figure, the curves do not intersect on the edge or other part of the file, thus tending to prevent the clogging of the file by the material operated upon.

Figure 5:
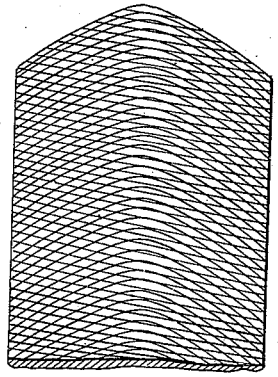

Referring to Fig. 5 the teeth are arranged on hyperbolic or approximately hyperbolic curves as in Fig. 1 but these teeth are interrupted at intervals by means of crosscuts. The cross-cuts shown in the drawing are straight lines but they may take any other form, for example, intermittent gaps.

Figure 6:
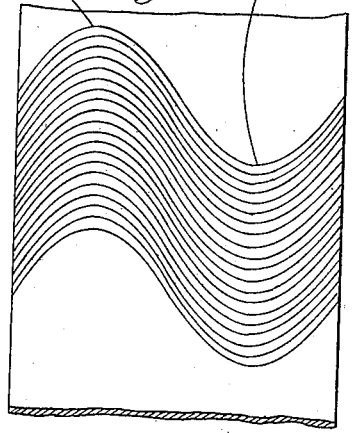

In Fig. 6 a file is shown having teeth lying on curves, the curves on one side of one face of the file presenting a convex edge to the file tip and on the other side of the same surface of the file a concave edge to the file tip thereby giving a waved form to the curves on which the teeth lie.

In the modifications described in connection with Figs. 1, 3, 4 and 5, the curves on which the teeth of the file lie are convex with respect to the tip of the file but obviously the curves may be so arranged that they are concave with respect to the tip. Further the curves may be arranged so as to be asymmetrical with the axis of the file. By the use of teeth arranged on curves as described above, efficient and uniform cutting angles are obtained, such as cannot be found in files as at present constructed.

It is within this invention to construct a round file having the teeth arranged on curves as described above. For example, a rat-tail file with the teeth lying on ellipses inclined at an angle of about 45° to the axis of the file. The developed surface of such a file would be somewhat similar to the surface of the file shown in Fig. 6. Further the surface of such a round file may be divided up into sections, each section having teeth arranged on a separate set of curves.

In constructing the files there is preferably employed a chisel cutting machine which gives the requisite strength of blow to a chisel or similar tool that is shaped to the curve desired. Any other method of cutting the teeth may however be employed as for instance, burring, planing, milling or a hand hammer and a chisel of the desired shape, any of which methods are well known in practice.

It is within this invention to construct a file having the teeth lying on curves as described above, the curves on any one surface being different and intersecting or not.

In the files illustrated the number of teeth per inch is shown as about ten. Obviously a greater or lesser number of teeth per inch can be utilized.

What I claim as my invention and desire to secure by Letters Patent is:—

1. A file, rasp or similar tool having continuously curved teeth which, on each side of a narrow zone, slowly change in direction and are obliquely arranged so as to approximate the sides of a V, and within such narrow zone more quickly change in direction to form a blunt curved connection for the sides of the V.

2. A file, rasp or similar tool having teeth obliquely inclined like the sides of a V on each side of a narrow zone symmetrical with respect to the axis of the tool, and within such narrow zone curved to form a blunt curved connection for the sides of the V.

In testimony whereof I have signed my name to this specification in the presence of two subscribing witnesses.

ERNEST ARMSTRONG.

Witnesses:
PERCY HEWITT,
FREDK. L. RAND.

Copies of this patent may be obtained for five cents each, by addressing the "Commissioner of Patents, Washington, D. C."